(12) United States Patent
Strommen

(10) Patent No.: US 6,762,139 B2
(45) Date of Patent: Jul. 13, 2004

(54) FLEXIBLE ADSORBENT FILTER

(75) Inventor: Michael R. Strommen, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 157 days.

(21) Appl. No.: 09/929,205

(22) Filed: Aug. 14, 2001

(65) Prior Publication Data

US 2003/0073370 A1 Apr. 17, 2003

(51) Int. Cl.[7] ............................. B02B 5/16; D04H 1/00
(52) U.S. Cl. ......................... 442/417; 442/62; 442/74; 442/75; 442/121; 442/149; 442/151; 428/107; 428/108; 428/113; 428/143; 428/240
(58) Field of Search ........................... 442/62, 74, 75, 442/121, 149, 151, 417, 352; 428/107, 108, 113, 143, 369–372, 317.9, 323

(56) References Cited

U.S. PATENT DOCUMENTS

| | | |
|---|---|---|
| RE24,906 E | 12/1960 | Ulrich |
| 3,538,020 A | 11/1970 | Heskett et al. |
| 3,691,004 A | 9/1972 | Werner et al. |
| 3,837,988 A | 9/1974 | Hennen et al. |
| 3,971,373 A | 7/1976 | Braun |
| 4,081,501 A | 3/1978 | Muther |
| 4,227,350 A | 10/1980 | Fitzer |
| 4,296,166 A * | 10/1981 | Ogino .................. 442/32 |
| 4,351,683 A | 9/1982 | Kusilek |
| 4,411,948 A * | 10/1983 | Ogino et al. ............ 442/58 |
| 4,433,024 A | 2/1984 | Eian |
| 4,906,263 A | 3/1990 | Von Blücher et al. |
| 5,124,177 A * | 6/1992 | Kasmark et al. ........ 427/202 |
| 5,212,131 A * | 5/1993 | Belding ................ 502/60 |
| 5,332,426 A | 7/1994 | Tang et al. |
| 5,486,410 A | 1/1996 | Groeger et al. |
| 5,616,169 A | 4/1997 | Ruiter et al. |
| 5,662,728 A * | 9/1997 | Groeger ................ 96/153 |
| 5,696,199 A * | 12/1997 | Senkus et al. ........... 524/548 |
| 6,207,255 B1 * | 3/2001 | Fukuura et al. ......... 428/175 |
| 6,423,123 B1 * | 7/2002 | Rosenberg et al. ....... 96/154 |
| 6,528,439 B1 * | 3/2003 | Stokes et al. .......... 442/352 |

* cited by examiner

Primary Examiner—Norca L. Torres-Velazquez
(74) Attorney, Agent, or Firm—Gary L. Griswold; Robert W. Sprague; William J. Bond

(57) ABSTRACT

The invention comprises a flexible adsorbent-loaded filter formed from a flexible support web and attached adsorbent particles. The adsorbent-loaded filter has open filter cells which are defined by the support web and the attached adsorbent particles and are random in size and orientation through the length and depth of the filter. The support web is formed of substantially nonlinear filaments that randomly intersect. The adsorbent particles largest average cross sectional dimension is smaller than the average diameter of the pores of the support web. When the flexible adsorbent loaded filter is flexed about a radius of curvature 20 mm, the percent increase in pressure drop is less than 100 percent when measured at a face velocity of 0.25 m/s.

17 Claims, 3 Drawing Sheets

FLEXIBLE ADSORBENT FILTER

BACKGROUND AND FIELD OF THE INVENTION

The present invention relates to an improvement in the use of adsorbent particles on a support structure so as to form a flexible adsorbent filter media.

U.S. Pat. No. 5,332,426 describes a self-supporting filter formed of agglomerated adsorptive particles, which adsorbent is preferably activated carbon. The carbon or other similar adsorptive materials are preheated to a temperature generally above the softening temperature of the binder particles. The binder particles are then added under mixing conditions resulting in the formation of agglomerates of the binder and adsorbents. The binder particles are attached to the surface of the adsorptive particles which results in the formation of agglomerates. The agglomerates can then be further joined to each other under heat and optionally a certain amount of pressure to directly form an adsorbent filter. The direct mixing of binder and activated carbon and the like to form a filter is described in U.S. Pat. No. 3,538,020. In this case, the carbon and binder are directly formed into a filter without the intermediate formation of agglomerates. In this patent, the carbon or adsorbent particles are joined directly to each other. This results in a higher concentration of carbon, but the pressure drop is very high and unacceptable for many uses. In either method where adsorbants are bonded to each other to form a filter, the resulting filter is rigid so that it has to be directly formed into its final intended end use shape, which is complicated and expensive for non-flat filter structures.

Activated carbon or other adsorptive particles have also been attached to supporting structures, such as disclosed in U.S. Pat. No. 4,906,263. In this patent, a carrier framework, comprised of wires, monofilaments or stays, is coated with an adhesive or binder. After the binder is in place, activated carbon or like adsorptive particles are added and attached to the support structure. This patent describes that the distances between the structural elements of the support structure are large enough so as to allow the carbon particles to interpenetrate into the depth of the structure covering the support or structural elements. The carrier framework described in this patent is preferably from three to ten times as open as the diameter of the adsorbent particles to provide a highly air permeable filter. The filter media is described as designed to be stable in shape. The support structures are specifically described as reticulated foams with a pore size of 1.5 mm to 4 mm, a lattice of wire mesh with a mesh width of 1 mm to 5 mm, spirally wound wires with a spiral diameter of 0.3 mm to 10 mm, or fiber brushes. The wire mesh or the reticulated foams can be formed into sheets, but these sheets are not readily bendable without substantial deformation of compression of the pore structure. A similar-type support structure is disclosed in U.S. Pat. No. 6,207,255.

It is also known to physically entrap carbon particles and the like within a support structure, such as disclosed in U.S. Pat. No. 4,081,501. In this patent, carbon particles or the like are mixed with air and forced into a fibrous web, although an adhesive can be added for further binding, the adsorbent particles penetrate into the support structure under the force of the air pressure and become entrapped. In U.S. Pat. Nos. 3,971,373 and 4,433,024 binder particles are structurally entrained in a blown microfiber web by introducing particles into the fiber stream prior to collection of the fibers as a coherent web. This method allows a large quantity of adsorbent particles to be contained within a matrix where the particles can comprise up to 99% of the web structure and then can be joined to a further layer.

U.S. Pat. No. 5,486,410 describes forming a web from composite fibers consisting of a structural component and a lower-melting binding component. The web is heated to melt or soften the binding component, which acts as an adhesive, prior to applying the adsorbent particles.

These nonwoven fiber-based adsorbent filters are very dense structures and exhibit high-pressure drops similar to filters where the adsorbent particles are directly bonded each to the other. The nonwoven-based webs are generally flexible but are not shape retaining and can become easily compressed when bent or deformed about a radius of curvature.

There is a need for extremely open adsorbent filters, such as those described by U.S. Pat. No. 4,906,263, which also can be bent or deformed out of a plane without significantly affecting the pressure drop performance of these filter structures. Flexible or deformable high air flow filters would find use particularly where significant pressure drops are not acceptable such as air conditioners, automotive cabin air filters, furnace filters, and the like. In these uses there is often limited space for large flat filters, and there is a need to avoid significant pressure drops, which could result in significant health or safety concerns. However for manufacturing, transportation, packaging, and marketing reasons it is desirable that filters be flat prior to use and then assume a three-dimension form when used, by flexing, without a subsequent large increase in pressure drop due to deformation or consolidation of the filter pore structure when the filter is bent.

SUMMARY OF THE INVENTION

The invention comprises a flexible adsorbent-loaded filter formed from a flexible support web and attached adsorbent particles. The adsorbent-loaded filter has open filter cells which are defined by the support web and the attached adsorbent particles and are random in size and orientation through the length and depth of the filter. The support web is formed of substantially nonlinear filaments that randomly intersect. The adsorbent particles largest average cross sectional dimension is smaller than the average diameter of the pores of the support web. When the flexible adsorbent loaded filter is flexed about a radius of curvature 20 mm, the percent increase in pressure drop is less than 100 percent when measured at a face velocity of 0.25 m/s.

DETAILED DESCRIPTION OF THE INVENTION

Figure 1:
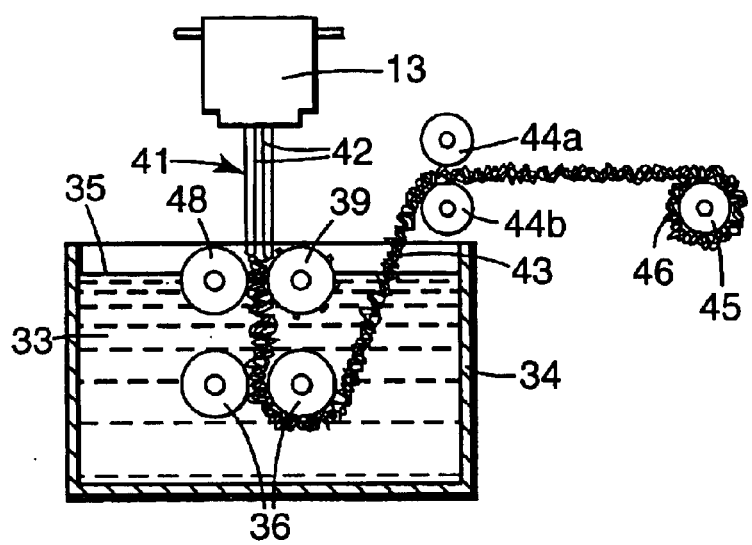
FIG. 1 is a schematic view in elevation and partial cross-section showing an embodiment of an apparatus that can be used to make coiled-filaments nonwoven web.
Figure 2:
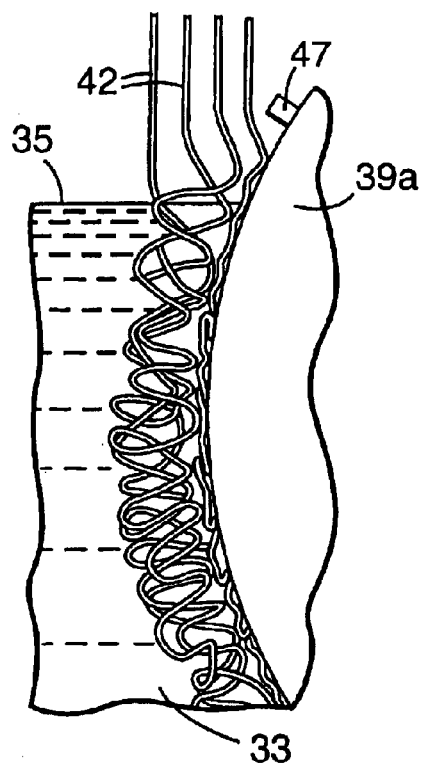
FIG. 2 is an enlarged view of a portion of FIG. 1.

The flexible adsorbent filter of the invention comprises a three-dimensional self supporting support base or web and adsorbent particles attached to the support base. The particulate adsorbents are preferably attached to the support by an adhesive, which can be applied to the support base followed by attachment of the particles. The self-supporting support base is preferably a three dimensional network of random large diameter thermoplastic filaments. The filaments are randomly coiled or the like and generally can be continuous or noncontinuous. The filaments form an open network of macropores; which macropores are defined by the nonlinear coiled filaments. Preferably the coiled filaments are undrawn, tough, durable, melt-bondable, thermoplastic, large-diameter filaments comprising synthetic organic plastic polymer or blends or multicomponent polymer filaments, preferably thermoplastic polymers which can be semicrystalline, such as polyolefins, nylon, polyester, or ethylene-vinyl acetate copolymer. The filaments are preferably elongate and contiguous. The plastics forming the filaments can further have incorporated adjuvants or additives to enhance a property of or impart a property to the filament, such as stabilizers, processing aids, fillers, coloring pigments, crosslinking agents, foaming agents, and fire retardants. The filament can also comprise a plurality, e.g., 2 to 5, of components such as bicomponent filaments, such as a sheath-core or side-by-side filaments.

A method of making the above-described filament support base comprises the steps of simultaneously (or cojointly) melt-extruding thermoplastic polymers via one or a plurality, e.g., 1 to 2500, preferably 500 to 1800, of extruder die openings or orifices, in the form of a single or a plurality of discrete and separate hot, tacky molten filaments, entangling the filaments into the form of a web, cooling them, for example, in a water quench bath, and recovering the resulting non-tacky, solidified filaments as a web of such filaments. The plurality of solidified filaments are preferably self-bonded to one another by the heat of the fibers as they are entangled and/or by subsequent heating the open, non-woven web of coiled entangled filaments. Such bonding car be accomplished without requiring or using a coating or otherwise applying to the filaments a binder resin, solvent, or extra adhesive or mixing the filaments with so-called binder fibers, though such materials may be used if needed or to supplement the self-bonding of the filaments.

Generally the filaments can have a width, diameter, or cross-section dimension of at least 0.05 mm, preferably at least 0.1 mm, which dimension generally will be in the range of 0.05 to 2 mm, preferably 0.1 to 1 mm. The filament cross sectional dimension (and shape of the cross section) is preferably substantially, or essentially, uniform along the length of the filament, e.g., uniformly round. The surface of the filament is typically smooth. The filaments can be the shape or form of fibers, strips, or other narrow and long shapes. Aggregations can be made up of a plurality of filaments with the same or different plastic compositions, geometric shapes, sizes, and/or diameters. The filaments can be solid, hollow, or porous, and helical, spiral, looped, coiled, sinuous, undulating, or convoluted. They can be circular or round in cross section or non-circular in cross section, e.g., lobal, elliptical, rectangular, and triangular. The filaments are preferably continuous in length, that is, of indefinite length.

The filaments are preferably melt-bondable, which means that a plurality or aggregation of such filaments as an open, non-woven web, can be bonded together at their points of contact or intersection to form a self supporting bonded structure by either heating the filaments sufficiently, to melt or soften a portion of the filaments or by use of the latent heat of the fibers as extruded.

The filaments form lofty webs of interengaged, intertwined, interlocked, or entangled filaments. The filaments are generally helical, spiral, looped, coiled, curly, sinuous or otherwise convoluted and extend from one end of the web to an opposite end of the web. The webs can further be cut to any desired size or shape.

The filaments are melt-extruded as a bundle or group of free falling, closely spaced, generally parallel, discrete, continuous, filaments of hot, tacky, deformable, viscous polymer melts, the hot filaments are then convoluted (e.g. coiled) and cooled, or quenched, to a generally non-tacky or non-adhesive solid state. The hot filaments can be cooled by contact with a cooling means or medium, such as a liquid quench bath, e.g., a body of water. The web can then be advanced or conveyed through the bath and withdraw therefrom. The web is convoluted (e.g. coiled) into discrete continuous filaments as the filaments are conveyed through the quench bath at a take-away speed which is less than the speed of the filaments entering the quench bath. This permits the falling, molten, still deformable filaments to convolute (e.g. coil into an essentially helical shape) adjacent the surface of the quench bath as described in U.S. Pat. No. 4,227,350. The use of a surfactant (for example, as described in said U.S. Pat. No. 3,837,988) in the quench bath may be desirable to aid coil formation.

The contact surface(s) may be used which may be in motion, as for example the surface of a rotating cylindrical drum as described in said U.S. Pat. No. 4,351,683, so as to collect the newly forming web and help convey it into and/or through the quench bath. The substrate may alternatively be stationary, for example, a plate as described in said U.S. Pat. No. 3,691,004. (Said descriptions of said U.S. Pat. Nos. 4,227,350; 4,351,683 and 3,691,004 are incorporated herein by reference.) The unified web thus formed comprises overlapping or entangled loops or coils of filaments and has sufficient structural integrity to allow the web to be conveyed, transported, or otherwise handled.

In FIG. 1, an extruder die assembly 13 (which, as in FIG. 1A, is connected to extruders and optionally to metering pumps, not shown in FIG. 1B) extrudes downwardly a plurality or bundle 41 of hot, viscous, tacky, closely-spaced, discrete, continuous, large-diameter filaments 42, which fall freely in the quiescent ambient air into tank 34. The bundle 41 can be aligned so that some of the hot, viscous filaments 42 are permitted to make glancing contact with the outer surface of a guide roll 39. The roll 39 is optionally provided with spaced-apart guide pins or pegs 47, or some other type of guide, such as a stationery plate, to guide the hot, viscous filaments as they move, toward the surface 35 of a body or bath 33 of quench liquid, such as water, in tank 34. The surface of the quench liquid is disposed a suitable distance below the lower face of the extruder die assembly of 13 so as to achieve the desired diameter of the filaments as they enter the bath. The guide roll 39 can be set to cause glancing contact with the filaments 42, as described in said U.S. Pat. No. 4,351,683, which description is incorporated herein by reference. As the hot, viscous filaments 32 fall in the ambient air, they begin to cool from the extruding temperature (which can range, for example, from 100° C. to 400° C.). The guide roll 39 (as well as optional roll 48 and other rolls downstream) can be set to rotate at a predetermined speed or rate such that the rate of lineal movement of the filaments 42 as they enter the body 33 of quench liquid is slower than the rate of linear movement of the hot, viscous filaments upstream of the guide roll(s). Since the take-away speed is slower than the speed of the hot filaments entering the quench bath 33, and the filaments 42 are still in a sufficiently viscous, deformable, or molten state, the filaments entangle or aggregate themselves by coiling, undulating, or oscillating just above the surface 35 of the quench liquid 33 into which they enter and can further cool, e.g., to about 50° C., quickly enough so that their shape does not deform, and solidify or rigidify just below the surface 35. A degree of resistance is imparted to the flow or free fall of the hot, viscous filaments 42 about the surface 35 by the already quenched, aggregated filaments in the quench bath 33 (quench liquid and quench bah are both referred to as 33) which causes the still deformable filaments entering the quench bath to coil, oscillate, or undulate just above the surface of the bath. This motion establishes irregular or random periodic contact between the still-hot filaments, resulting in spot- or tack-bonding of contiguous surfaces of the filaments at their points of contact or intersection. Consequently, the filaments 42 assume a coiled, looped, sinuous or undulating configuration and become entangled or inter-engaged. The filaments 42 upon entering the quench liquid 33 and passing adjacent immersed guide roll 39 form an integrated web 43 of spot- or tack-bonded, solidified filaments.

The web 43 can be conveyed and withdrawn from the tank 34 by means of pinch rolls 44a and 44b and wound by roll 45 to form a winding 46 of the web. The web 43 can then optionally be unwound from winding 46 and placed in an air-circulating oven or the like to heat the web to an appropriate temperature for a sufficient time, e.g., 120° to 300° C., preferably 140° to 250° C., for 1 to 5 minutes, and then cooled to room temperature (e.g., 20° C.) to cause further melt-bonding of the contiguous surfaces of the filaments in the web at their points of contact. The web generally has a high void volume, e.g., 40 to 99%, preferably 80% to 99%.

Examples of thermoplastic polymers which can be used to form the filaments or components thereof include polymers selected from the following classes: polyolefins, such as polyethylenes, polypropylenes, polybutylenes, blends of two or more of such poloyolefins, and copolymers of ethylene and/or propylene with one another and/or with small amounts of polymerizable, higher, alpha olefins, such as pentene, methylpentene, hexane, or octane; halogenated polyolefins, such as chlorinated polyethylene, poly (vinylidene fluoride), poly (vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylenedipamide), e.g., nylon 6 and nylon 6,6; nylon elastomers; such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth) acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid-grafted homo- or co-polymers of olefins and blends of two or more of such polymers, such as blends of polyethylene and poly(methyl acryl ate), blends of ethylene-vinyl acetate copolymer and ethylene-methyl acrylate; and blends of polyethylene and/or polypropylene with poly(vinyl acetate). The foregoing polymers are normally solid, generally high molecular weight, and melt-extrudable such that they can be heated to form molten viscous liquids which can be pumped as streams to the extrusion die assembly and readily extruded therefrom under pressure as the multicomponent filaments. The same thermoplastic substance can serve as component (b), e.g., a sheath, in one embodiment of the filaments and as component (a), e.g., a core, in another embodiment of the filaments.

The thus formed support web can be coated with an adhesive or binder on all or a portion of its surface area. Examples of suitable emulsion, hot melt, curable, or solvent-based adhesives or binders or pressure sensitive adhesives include (meth)acrylate-based pressure sensitive adhesives, such as those described in U.S. Patent No. Re 24,906 (Ulrich), polyurethane adhesives, natural or synthetic rubber-based adhesives, epoxy adhesives, curable adhesives, phenolic adhesives, and the like. When solvent-based adhesives or binders are used, the low molecular weight component and solvents are evaporated or otherwise removed prior to attachment of the adsorbent particles to avoid contamination of the adsorbent pore structure.

The adsorbent particles are generally free flowing and abrasion-resistant and have average aspect ratios generally from 1 to 5, preferably 1 to 3. The aspect ratio is defined as the ratio of the largest cross sectional dimension to the smallest cross sectional dimension. The adsorbent particle largest average cross sectional dimension is smaller than the average diameter of the pores or openings of the support web, generally two tims smaller or more, preferably 2 to 100 times smaller, most preferably 2 to 10 times smaller.

The adsorbents can consist of organic or inorganic materials which have active sites or deposition spaces or pores. Preferably, the adsorbent particles are formed of activated carbon or charcoal. The adsorbers can also be molecular sieves, or they can consist of highly porous materials saturated with chemicals such, as acids, e.g., phosphoric acid or citric acid, or bases, e.g., potassium carbonate or potassium bicarbonate, or carry substances with a catalytic effect, such as metals, e.g., platinum, palladium, or silver.

The adsorbent-loaded filter is characterized as flexible and having open cells defined by the support web and the attached adsorbent particles. The filter cells are random in size and orientation through the length and depth of the filter. The cell structures are defined by the support web, which generally is formed of substantially nonlinear filaments that randomly intersect. The filaments are generally nonlinear between their points of contact or bonding. The filaments are formed of a flexible polymer, such as described above for the preferred coiled support web. The pore cell size of the support web without the adsorbent particles is preferably on average from 1 to 10 mm, preferably 2 to 5 mm, as measured by passing suitably sized spherical solids into and through the web.

The flexible adsorbent-loaded filter generally is able to flex about a radius of curvature of 5 mm or greater. For example, at a radius of curvature of 20 mm, the percent increase in pressure drop at a face velocity of 0.25 m/s is generally less than 100 percent, preferably less than 50 percent, and most preferably less than 35 percent. The overall filter generally has an average thickness of from 5 to 50 mm, preferably from 5 to 30 mm. With a thickness below this range, the adsorbent loading level is to low for most applications, with thicknesses greater than 50 mm, the flexibility of the filter is reduced.

This filter's flexibility without substantial increase in pressure drop allows the invention filters to be manufactured in a flat form and curved into a final use form without significantly affecting pressure drop performance. This is significant in terms of manufacturability as it is difficult and costly to directly manufacture complex curved shapes in a filter support structure and hence a final filter form.

EXAMPLES

Test Procedures

Pressure Drop

Pressure drop across a filter web was determined by measuring the difference between the static air pressure at a given face velocity upstream of the filter sample and downstream of the filter sample. Pressure drop was determined using the Society of Automotive Engineers (SAE) test method J1669. Volumetric flow rates were adjusted to obtain the indicated face velocities based on the sample area normal to the air flow direction.

Support Webs

Support 1 (CW)

A nylon nonwoven coiled web media with a 0.29 mm average fiber diameter, an average pore diameter of 3–6 mm, 12 mm thick, and a solidity of 3.3%, prepared substantially as described in U.S. Pat. No. 4,227,350 (Fitzer, which is incorporated herein by reference).

Support 2 (PUR)

A polyurethane open cell reticulated foam having an average of 1.6 pores per cm, an average pore diameter of 3–6 mm, 12 mm thick, and a solidity of 2.5%, commercially available from Crest Foam Industries, Inc. (Moonachie, N.J.).

Carbon Loaded Web Preparation

Carbon-loaded filters CW-GAC and PUR-GAC were prepared by saturating the support webs (CW and PUR) with a (meth)acrylic based pressure-sensitive adhesive FAST-BOND 49 (available from Engineered Adhesives Division, 3M Company, St. Paul, Minn.). Excess adhesive was removed by tapping the sample on a solid surface until no adhesive film was observed spanning the pores of the support. Untreated coconut-derived granular activated carbon (GAC), commercially available from Kuraray Chemical Company (Okayama, Japan), having a U.S. mesh size of 25×45 (diam.=0.36 mm to 0.71 mm) was adhered to the support by placing the adhesive-coated support and excess GAC particles in a sealed bag and shaking until the support was uniformly coated with GAC particles. Loose and weakly bound GAC particles were removed from the filters by tapping the filters on a solid surface, and the resulting loaded filters were placed in a circulating air oven operating at 150° C. for five minutes to remove any remaining water from the adhesive emulsion. The GAC-loaded filter samples are characterized in Table 1.

TABLE 1

| Sample | Carbon Loaded Web Characterization | | |
|---|---|---|---|
| | Support Basis Weight (g/m$^2$) | Adhesive Add-on (g/m$^2$) | Activated Carbon Add-on (g/m$^2$) |
| CW-GAC | 413 | 296 | 1182 |
| PUR-GAC | 313 | 413 | 1175 |

Example 1

Rectangular samples were die cut from the CW-GAC web and used for pressure drop testing. Test samples were configured as flat samples (73 mm×73 mm), and cylindrical samples having radii of curvature of 20 mm and 25 mm. The cylindrical samples were prepared from rectangular samples of 126 mm×X 40 mm and 157 mm×X 40 mm, respectively. The samples were formed into cylinders by applying FAST-BOND 49 adhesive along one end of the sample, forming the sample into a cylinder inside a cylindrically shaped open plastic netting sleeve having the desired radius of curvature, and in so doing bringing the adhesive-coated end into contact with the opposite end of the sample. Pressure drop measurements on the cylindrical filters were obtained with the GAC-loaded webs contained in the open plastic netting and subsequently corrected by subtracting the pressure drop contribution of the netting sleeve obtained independently from the GAC loaded web. Observed pressure drops for the various samples are reported in Table 2.

TABLE 2

Pressure Drop as a Function of Radius of Curvature For CW/GAC Based Filters

| Web | Air Velocity (m/s) | Radius of Curvature (mm) | | | Pressure Drop Increase Factor |
|---|---|---|---|---|---|
| | | Flat | 25 | 20 | (20 mm/Flat) |
| CW-GAC | 0.11 | 0.08 | 0.10 | 0.10 | 1.25 |
| CW-GAC | 0.25 | 0.24 | 0.29 | 0.34 | 1.42 |
| CW-GAC | 0.50 | 0.69 | 0.71 | 0.91 | 1.32 |
| CW-GAC | 0.75 | 1.24 | 1.27 | 1.58 | 1.27 |
| CW-GAC | 1.0 | 1.91 | — | 2.40 | 1.26 |

An examination of the data in Table 2 shows that for the GAC-loaded filter samples, the pressure drop across the filter sample increases as the radius of curvature of the filter sample decreases, i.e., as the filter is more highly flexed. Cylindrical filter samples having a radius of curvature of 20 mm exhibited the largest pressure drop increases (versus flat media), ranging from 25% to 42% at the indicated face velocities.

Comparative Example C1

GAC-loaded filter media was prepared substantially as described in Example 1 except that polyurethane reticulated foam-based webs PUR was substituted for the CW web. Observed pressure drops for the PUR-GAC sample samples are reported in Table 3.

TABLE 3

Pressure Drop as a Function of Radius of Curvature For PUR-GAC Based Filters

| Web | Air Velocity (m/s) | Radius of Curvature (mm) | | | Pressure Drop Increase Factor |
|---|---|---|---|---|---|
| | | Flat | 25 | 20 | (20 mm/Flat) |
| PUR-GAC | 0.11 | 0.04 | 0.12 | 0.16 | 4.00 |
| PUR-GAC | 0.25 | 0.09 | 0.49 | 0.62 | 6.89 |
| PUR-GAC | 0.50 | 0.33 | 1.10 | 1.55 | 4.70 |
| PUR-GAC | 0.75 | 0.50 | 1.86 | 2.88 | 5.76 |
| PUR-GAC | 1.0 | 0.77 | — | 4.05 | 5.26 |

An examination of the data in Table 3 shows that for the PUR-GAC loaded web samples, the pressure drop increase as a function of radius of curvature across all of the reticulated polyurethane foam-based filters was dramatically higher than the pressure drop increase observed for the nonwoven coiled web based filters (see Table 2). As was the case with the CW-GAC based samples, PUR-GAC cylindrical filter samples having a radius of curvature of 20 mm exhibited the largest pressure drop increases (versus flat media), ranging from 400% to 689% at the indicated face velocities.

TABLE 4

Pressure Drop Ratio Comparisons for Cylindrical Samples (20 mm Radius of Curvature)

| Air Velocity (m/s) | CW-GAC Pressure Drop Increase Factor (20 mm/Flat) | PUR-GAC Pressure Drop Increase Factor (20 mm/Flat) | Ratio Pressure Drop Increase Factors (PUR/CW) |
|---|---|---|---|
| 0.11 | 1.25 | 4.00 | 3.20 |
| 0.25 | 1.42 | 6.89 | 4.85 |
| 0.50 | 1.32 | 4.70 | 3.56 |
| 0.75 | 1.27 | 5.76 | 4.54 |
| 1.0 | 1.26 | 5.26 | 4.17 |

Examination of the pressure drop increase factors of a 20 mm radius of curvature cylinder vs. a flat web sample for the CW-GAC and PUR-GAC webs is summarized in Table 4. These results show that the CW-GAC based filter web, exhibit a lower pressure drop increase by a factor of between 3.20× and 4.85× versus the comparative PUR-GAC based filter webs when the filter webs are placed in identical cylindrical configurations.

Additionally, flexing flat samples of the CW-GAC and PUR-GAC webs and qualitatively observing the effect of the flexing on the pore shape and size confirms that the CW-GAC samples exhibit significantly less evidence of pore collapse or deformation than the PUR-GAC samples. This observation is consistent with the quantitative pressure drop data reported above, as pore collapse or deformation would result in a less open structure that would lead to a higher pressure drop increase for the PUR-GAC based materials.

Example 2 and Comparative Example C2

Macroscopic imaging, pore size, and pore shape analysis was conducted on support 1 (CW) and support 2 (PUR). An Infinvar™ Video Inspection Microscope from Infinity Photo-Optical Company (Boulder Colo.) coupled to a Cohu 4810 series CCD camera (COHU Inc., San Diego, Calif.) was used to obtain images of the samples. The images were captured and analyzed using a Quantimet Q-570™ (Leica Inc., Deerfield, Ill.).

All samples were imaged in the flat condition. Additionally, the flat samples were made to form a half cylinder by wrapping them about a 20 mm radius half-cylinder of glass. These curved samples were oriented so that the concave surface could be imaged and analyzed.

Figure 3:
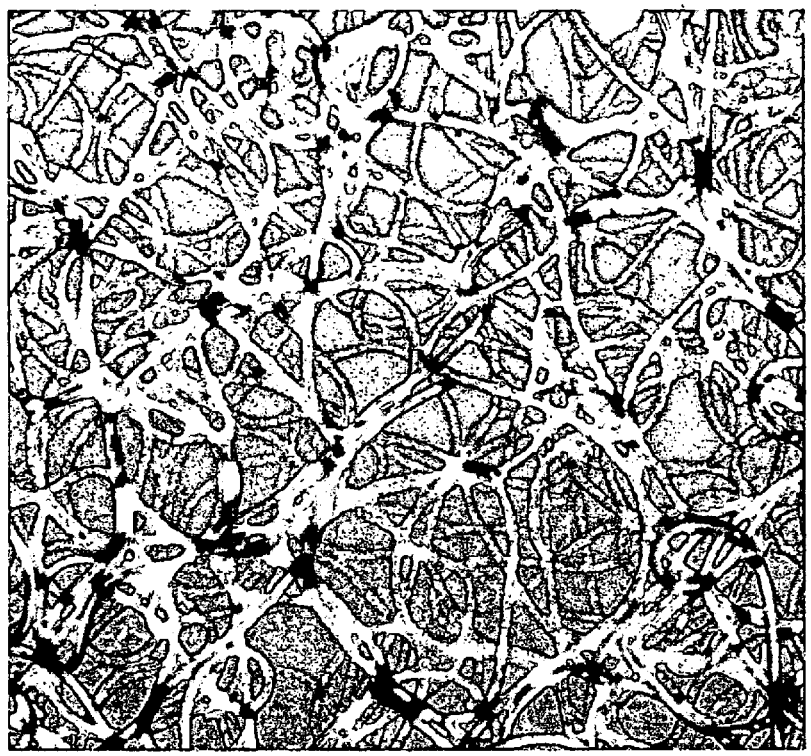
FIG. 3 is a photomicrograph of a coiled support web used in accordance with the invention.
Figure 4:
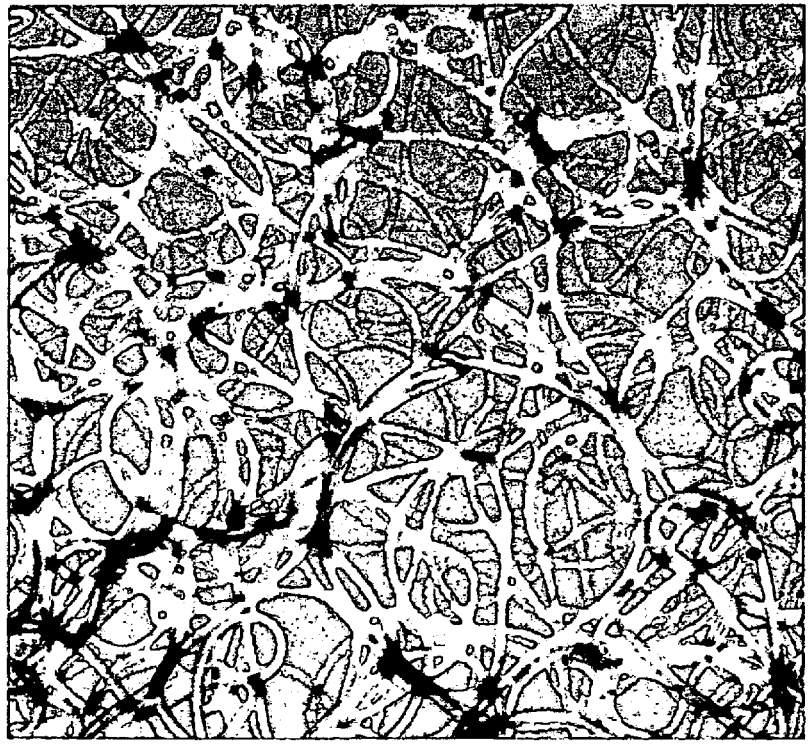
FIG. 4 is a photomicrograph of a coiled support web used in accordance with the invention while curved.

FIGS. 3 and 4 illustrate the flat and cylindrically configured nonwoven coiled web CW, respectively, viewing the same pores in both images. No systematic change in pore shape or size was observed as a result of configuring the nonwoven coiled web around a 20 mm radius half-cylinder of glass.

Figure 5:
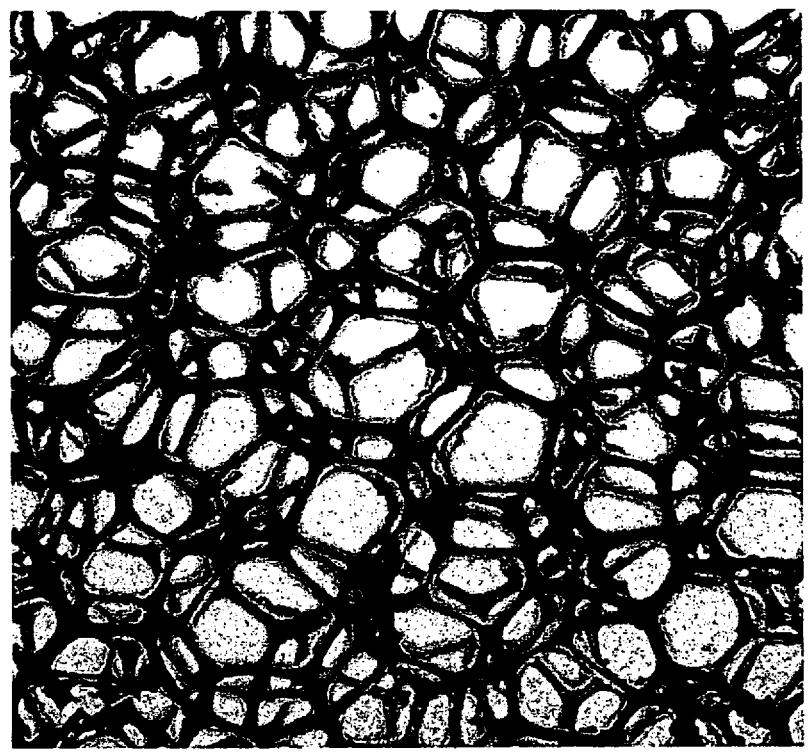
FIG. 5 is a photomicrograph of a reticulated foam support web
Figure 6:
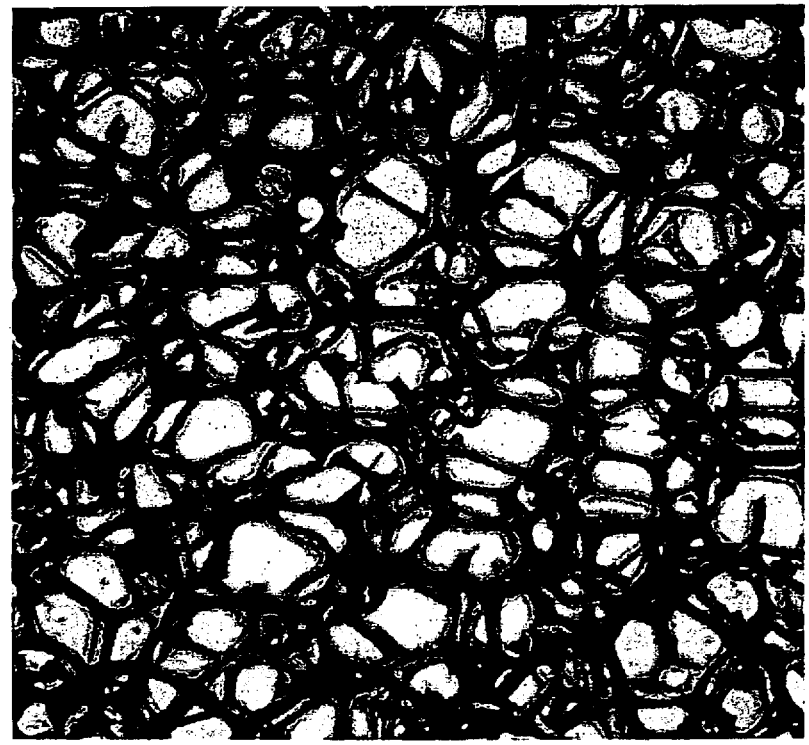
FIG. 6 is a photomicrograph of a reticulated foam support web while curved.

FIGS. 5 and 6 illustrate the flat and similarly cylindrically configured comparative reticulated foam support PUR, respectively, again viewing the same pores in both images. Typically the pores in the reticulated foam collapsed in the direction perpendicular to the axis of the cylinder about which it was wrapped, exhibiting shrinkage from 5% to 30% depending upon orientation of the triple junctions connecting the cells. Generally the length of the pores parallel to the cylinder axis were observed to increase approximately 5% to 10%, however, some pores did show a few percent decrease. Overall, the aspect ratio of the comparative reticulated foam pores on the inner radius of the cylinder are more elongate by 20% to 30% parallel to the axis of the cylinder than the equivalent pores in a flat comparative reticulated foam support.

Based on the above analysis, the nonwoven support CW exhibits significantly less pore deformation than the comparative reticulated polyurethane foam web PUR. The stability of the pore size and dimensions exhibited by the nonwoven coiled web supports is consistent with the smaller increase in pressure drop exhibited by the GAC-loaded filter sample CW-GAC of the present invention when it is placed in a cylindrical configuration relative to the larger pressure drop increase exhibited by the comparative carbon loaded reticulated foam filter support PUR-GAC when similarly configured.

I claim:

1. A flexible adsorbent-loaded filter comprising a flexible support web and attached adsorbent particles, wherein the adsorbent loaded filter is flexible and has open filter cells which are defined by the support web and the attached adsorbent particles, and are random in size and orientation through the length and depth of the filter, the support web is formed of substantially nonlinear filaments that randomly intersect and have an average diameter of from 0.05 to 2.0 mm, are coated with an adhesive or binder on all or a portion of the filaments surface area with the absorbent particles are adhered to the filaments through the entire support web, and the adsorbent particles largest average cross-sectional dimension is smaller than the average diameter of the pores of the support web which pore size is an average from 1 to 10 mm without the absorbent particles wherein when the flexible adsorbent loaded filter is flexed about a radius of curvature of 20 mm, the percent increases in pressure drop is less than 100 percent when measured at a face velocity of 0.25 m/s.

2. The flexible adsorbent-loaded filter of claim 1, wherein the adhesive is a (meth)acrylate pressure sensitive adhesive and is substantially free of low molecular weight component and solvents.

3. The flexible adsorbent-loaded filter of claim 1, wherein the adsorbent particles have aspect ratios from 1 to 5.

4. The flexible adsorbent-loaded filter of claim 1, wherein the adsorbent particles have aspect ratios 1 to 2.

5. The flexible adsorbent-loaded filter of claim 1, wherein the adsorbents comprise activated carbon or charcoal.

6. The flexible adsorbent-loaded filter of claim 1, wherein the support web filaments are generally nonlinear between their points of contact or bonding.

7. The flexible adsorbent-loaded filter of claim 1, wherein the adsorbent particles largest cross sectional dimension is 2 to 100smaller than the diameter of the pores of the support web.

8. The flexible adsorbent-loaded filter of claim 7, wherein the adsorbent particles largest cross sectional dimension is 2 to 10 times smaller than the diameter of the pores of the support web.

9. The flexible adsorbent-loaded filter of claim 1, wherein the support web is a coiled support web formed from substantially continuous filaments.

10. The flexible adsorbent-loaded filter of claim 1, wherein the pore size of the support web without the adsorbent particles is on average from 2 to 5 mm.

11. The flexible adsorbent-loaded filter of claim 1, wherein are formed of a flexible thermoplastic polymer.

12. The flexible adsorbent-loaded filter of claim 11, wherein the filaments have an average diameter of at least 0.1 mm.

13. The flexible adsorbent-loaded filter of claim 1, wherein flexible adsorbent-loaded filter is able to flex about a radius of curvature of 5 mm or more.

14. The flexible adsorbent-loaded filter of claim 1, wherein the overall filter generally has a thickness from 5 to 50 mm.

15. The flexible adsorbent-loaded filter of claim 1, wherein the overall filter generally has a thickness of from 5 to 20 mm.

16. The flexible adsorbent-loaded filter of claim 1, wherein at a radius of curvature of 20 mm the percent increase in pressure drop is less than 50 percent when measured at a face velocity of 0.25 m/s.

17. The flexible adsorbent-loaded filter of claim 1, wherein at a radius of curvature of 20 mm, the percent increase in pressure drop is generally less than 35 percent when measured at a face velocity of 0.25 m/s.

* * * * *

UNITED STATES PATENT AND TRADEMARK OFFICE
CERTIFICATE OF CORRECTION

PATENT NO. : 6,762,139 B2
DATED : July 13, 2004
INVENTOR(S) : Strommen, Michael R.

It is certified that error appears in the above-identified patent and that said Letters Patent is hereby corrected as shown below:

Column 1,
Line 30, delete "adsorbants" and insert -- adsorbents --.

Column 3,
Line 37, delete "car" and insert -- can --.

Column 5,
Line 50, delete "hexamethylenedipamide" and insert -- hexamethylene adipamide --.

Column 6,
Line 36, delete "," after "such".

Column 8,
Line 21, Table 2, delete "CW/GAC" and insert -- CW-GAC -- .

Column 9,
Line 24, delete "web," and insert -- webs --.

Column 10,
Line 27, delete "and" and insert -- wherein said filaments --.
Line 28, delete "mm," and insert -- mm and --.
Line 29, after the word "area", insert -- , -- and delete "absorbent" and insert -- adsorbent --.
Line 32, delete "pores" and insert -- open filter cells --.
Line 33, delete "web which pore size is an" and insert -- web, the diameter of the open filter cells is on --.
Line 35, delete "absorbent" and insert -- adsorbent --.

Signed and Sealed this

Seventh Day of December, 2004

JON W. DUDAS
*Director of the United States Patent and Trademark Office*